United States Patent Office 3,576,883
Patented Apr. 27, 1971

3,576,883
ALKYLIDENEDITHIOBISPHENOLS
Martin B. Neuworth, Pittsburgh, Pa., assignor to
Consolidation Coal Company, Pittsburgh, Pa.
No Drawing. Continuation-in-part of application Ser. No.
637,649, May 11, 1967. This application June 30, 1969,
Ser. No. 837,956
Int. Cl. C07c *149/36;* A61k *27/00*
U.S. Cl. 260—609          9 Claims

ABSTRACT OF THE DISCLOSURE

Compounds having the general formula:

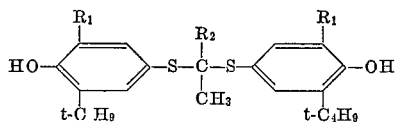

where $R_1$ is an alkyl radical containing from 1 to 4 carbon atoms, and $R_2$ is either hydrogen or an alkyl radical containing from 1 to 3 carbon atoms, provided that when $R_1$ is methyl, $R_2$ is also methyl. An example of the compounds of this invention is one represented by the following formula:

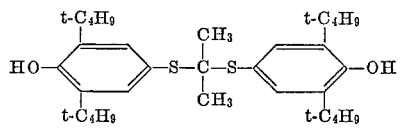

The compounds are useful for reducing blood cholesterol in warm-blooded animals.

CROSS-REFERENCE TO RELATED APPLICATION

This is a continuation-in-part of application, Ser. No. 637,649, filed May 11, 1967, now abandoned. Another related application is my copending application, Ser. No. 835,811, filed June 23, 1969 and assigned to the assignee of the present invention.

BACKGROUND OF THE INVENTION

Field of the invention

This invention relates to a new and useful group of sulfur-containing bisphenols.

Description of the prior art

U.S. Pats. Nos. 2,278,224 and 2,472,318 describe compounds defined by the formula DR$x$R'$x$RD, in which R is an aryl or alkyl aryl, or a substituted aryl or alkyl aryl group, $x$ is a sulfur, oxygen or tellurium, but preferably a sulfur group, R' is an alkyl or substituted alkyl group and D is an inhibitor group taken from the class of hydroxy, amino, sulfide, disulfide or polysulfide groups. The utility set forth in the patents for the described compounds is stabilization of lubricating oils.

SUMMARY

The novel chemical compounds of the present invention possess the property of lowering the cholesterol content of blood. They have the following general formula:

(1) 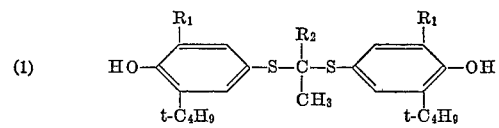

where $R_1$ is an alkyl radical containing from 1 to 4 carbon atoms, and $R_2$ is a radical selected from the class consisting of hydrogen and an alkyl radical containing 1 to 3 carbon atoms, provided that when $R_1$ is methyl, $R_2$ is also methyl. Those having the following formulae are especially favored:

(2) 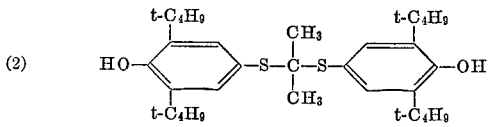

where $R_3$ is a radical selected from the class consisting of hydrogen and an alkyl radical containing 1 to 3 carbon atoms; and (3) 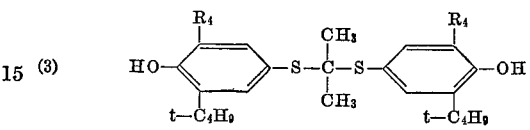

where $R_4$ is an alkyl radical containing 1 to 3 carbon atoms.

The compounds of the present invention may be readily prepared as follows. The starting material is the appropriate mercaptophenol which may be prepared by any one of several known methods. For details, see Organic Reactions, vol. III, chapter 6, by Roger Adams et al.; also the article by Müller et al., entitled "Untersuchungen an schwefelhaltigen Aroylen mittels der Electronenresonanz" in Liebig's Annalen (1961, Bd. 645, p. 79); and U.S. Pat. No. 3,129,262.

The mercaptophenol is dissolved in a minimum of inert solvent to give a homogeneous reaction mixture. Concentrated hydrochloric acid (0.05 mole per mole of mercaptophenol) and at least a stoichiometric amount of the appropriate carbonyl compound are added, the former serving as catalyst. The reaction is shown in the following equation:

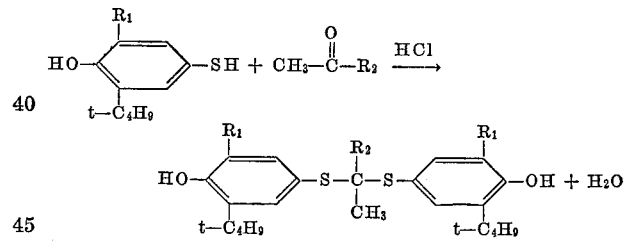

wherein $R_1$ and $R_2$ have the same meanings as in Formula 1 above. Initially, the reaction is mildly exothermic, but external heating is thereafter required to maintain the reaction temperature. Reaction times of about one to six hours are usually required. The product is then recovered from the reaction mixture in conventional fashion.

The following examples illustrate the preparation of the novel compounds of this invention. In each example, the chemical name and structural formula of the compound are first given. The identity of the compound produced in each example was established by conventional methods of analysis.

EXAMPLE 1

Preparation of 2,2 - bis - (3,5-di-t-butyl-4-hydroxyphenyl-mercapto)-propane

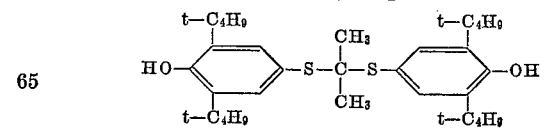

4-mercapto-2,6-di-t-butylphenol (47.5 grams, 0.2 mole) was dissolved in 50 milliliters of methanol at 50° C.; and 1.0 milliliter of concentrated HCl was added. Then, acetone (5.8 grams, 0.1 mole) was added with a resultant temperature rise to 60° C. The reaction mixture was maintained at 60°–65° C. for an hour and a half by heating; and was then allowed to cool. Ten milliliters of 10% aqueous sodium bicarbonate was added. The mixture was diluted with water and extracted with ether. The residue from the evaporation of the ether solution, a yellow viscous oil, was recrystallized from ethanol to form a white crystalline solid. This first crop of crystalline product weighed 33.0 grams and had a melting point of 124.5°–126° C. The liquor from the crystallization was concentrated by evaporation to yield 12.0 grams of a second crop of fine, slightly colored crystalline product. The total yield was 87.4%. When recrystallized from isopropyl alcohol, the product had a melting point of 125°–126.5° C.

EXAMPLE 2

Preparation of 2,2 - bis - (3,5-di-t-butyl-4-hydroxyphenylmercapto)-butane

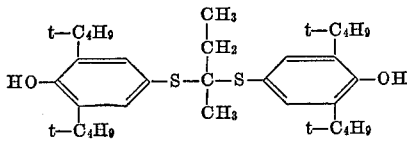

4-mercapto-2,6-di-t-butylphenol (47.6 grams) was dissolved in 50 milliliters of methanol. Ethyl methyl ketone (18.15 milliliters) was added to the solution and then 8 milliliters of 12 N HCl was added causing a temperature rise from 16° to 26° C. The reaction mixture was heated to reflux (69° C.) and held there for two hours. It was then cooled below 50° C.; and 100 milliliters of benzene was added. The mixture was transferred to a separatory funnel and washed three times with 100 milliliters of water to remove the acid. The benzene phase was separated and dried over magnesium sulfate. Benzene was stripped off on a rotary evaporator. A clear yellow oil remained which weighed 53.3 grams. The oil was dissolved in 100 milliliters of ethanol. The ethanol solution was seeded and cooled. Crystals formed which were collected by filtration and washed with 100 milliliters of cold ethanol. They were then air dried for five hours, and dried in a vacuum desiccator for one hour, after which they weighed 29.2 grams and melted at 134.1°–135.8° C. The product was recrystallized from 150 milliliters of hot ethanol. The crystals were washed with 100 milliliters of ethanol. They were then air dried for 2½ hours and in a vacuum desiccator for one hour. The final weight of the product was 22.5 grams (44.7% yield), and the final melting point was 135.0°–136.8° C.

EXAMPLE 3

Preparation of 2,2-bis-(3-t-butyl-5-methyl-4-hydroxyphenylmercapto)-propane

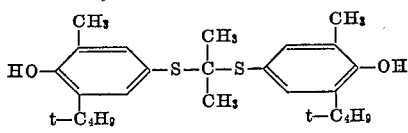

4-mercapto-6-t-butyl-o-cresol (39.3 grams, 0.2 mole) was dissolved in 30 milliliters of methanol at room temperature, and 1 milliliter of concentrated HCl was added. Then, acetone (5.8 grams, 0.1 mole) was added with a resultant temperature increase from 27° C. to 46° C. The reaction mixture was maintained by heating at 42°–45° C. for 45 minutes, and then allowed to stand for several hours. Large colorless crystals were observed in the flask. The liquid portion of the mixture was decanted. The crystals were dissolved in ether, and the solution extracted with 10% NaOH, water washed to pH 7, dried, and filtered. The ether solution was evaporated to dryness. The residue, a slightly colored waxy solid, was extracted with 250 milliliters of refluxing hexane. The hexane solution was allowed to cool to room temperature with resultant precipitation of 34.3 grams of a white powder which had a melting point of 156.5°–158.0° C. The hexane filtrate was evaporated to about 30 milliliters, allowed to cool to room temperature. Slightly yellow crystals precipitated amounting to 3.0 grams, and having a melting point of 153.5°–155.5° C. Based upon the two crops of crystals, the yield was 86%. A small sample of the product, recrystallized from isopropyl alcohol and dried in vacuo at 110° C., had a melting point of 155.5°–156.5° C.

EXAMPLE 4

Preparation of 2,2 - bis - (3-isopropyl-5-t-butyl-4-hydroxyphenylmercapto)-propane

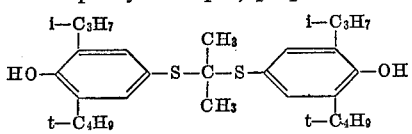

2-isopropyl-4-mercapto-6-t-butylphenol (44.8 grams), 50 milliliters of methanol, and 14.6 milliliters of acetone were mixed. To the mixture, 8 milliliters of 12 N HCl was added causing a temperature rise from 26° to 41° C. The reaction mixture was heated for two hours to a final temperature of 54° C. The solution was cooled in a water bath. Benzene (100 milliliters) was added to the solution in a separatory funnel, and the mixture washed three times with 100 milliliters of water to neutrality. The phases were separated, and the benzene phase was dried over magnesium sulfate. The magnesium sulfate was then filtered off, and the benzene was removed, first by stripping on a rotary evaporator and then by oil pump vacuum. A clear colorless, viscous oil remained which weighed 51 grams. The oil was dissolved in 75 milliliters of hot hexane and washed with 50 milliliters of 10% caustic solution, followed by 100 milliliters of water. The hexane solution was made slightly acidic with a few drops of HCl. It was then washed to neutrality with water and dried over magnesium sulfate. After the magnesium sulfate was filtered off, the hexane was stripped off under vacuum, leaving an oil which was dissolved in 60 milliliters of hot methanol. The methanol solution was cooled. Deionized water was added in increments until crystals began to form. A total of 10 milliliters of deionized water was necessary. The oil, containing a small amount of crystals, was cooled for completion of crystallization. The crystals were filtered and washed with 8 milliliters of 85.7% methanol solution, and air dried. The weight of the crystals was 11.9 grams and they melted at 74°–77° C. The crystals were triturated with 60 milliliters hexane and cooled. They were then filtered off and air dried. The dry product crystals weighed 9.1 grams and melted at 77.0°–79.8° C. A second crop of crystals was obtained from the methanol solution by adding cooled hexane to the solution and by further cooling. The slightly yellow crystals so obtained were filtered and air dried. They weighed 17.5 grames and melted at 74.2°–75.4° C. The two crops were dissolved in 25 milliliters of hot hexane. The crystals which precipitated were recovered by filtration and air dried. The final weight of product was 25.2 grams (51.6% yield), and the melting point was 74.3°–78.6° C.

EXAMPLE 5

Preparation of 1,1-bis-(3,5-di-t-butyl-4-hydroxyphenylmercapto)-ethane

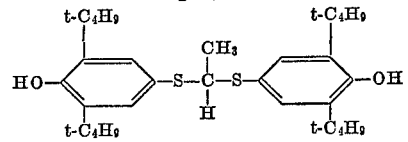

4-mercapto-2,6-di-t-butylphenol (47.5 grams, 0.2 mole) was dissolved in 50 milliliters of methanol at 50° C., and 1.0 milliliter of concentrated HCl was added. Then, acetaldehyde (4.4 grams, 0.1 mole) was added with no observable temperature rise from 53° C. The stirred solution was heated to maintain the temperature at 50°–55° C. for two hours and then was allowed to cool to room temperature. Then, 9.5 milliliters of 10% NaHCO₃ was added to neutralize the HCl. The mixture was diluted with 200 milliliters of $H_2O$, extracted with ether, and the ether portion extracted with 10% NaOH to remove unreacted mercaptophenol. The ether portion was water washed to pH 7, dried and evaporated to yield a yellow viscous oil (44.5 grams). This was redissolved in hot hexane, stirred with activated charcoal, filtered by gravity while hot, and again concentrated to a yellow solid (weight 41 grams, 82% yield).

EXAMPLE 6

Preparation of 2,2-bis-(3,5-di-t-butyl-4-hydroxyphenylmercapto)-pentane

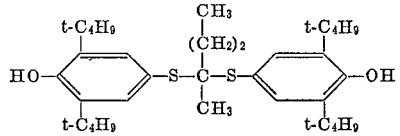

To a stirred mixture of 47.6 grams of 4-mercapto-2,6-di-t-butylphenol, 50 milliliters of methanol and 21.2 milliliters of 2-pentanone was added 8 milliliters of 12 N HCl. A dense crystal slurry and a temperature rise from 20° to 26° C. resulted. After ½ hour of heating, an emulsion formed (at 53° C.) which, an hour later, became a very viscous oil. In another 5 minutes, a dense crystal slurry appeared. The total time was about 1.5 hours, and the final temperature was 54° C. The slurry was allowed to cool (with stirring) to room temperature. The crystals were filtered off, washed with 50 milliliters of an 80% aqueous methanol solution and air dried. The crude crystals weighed 48.8 grams and melted at 129.2°–131.9° C. The product was dissolved in 200 milliliters hot ethanol and hot filtered. The solution was cooled to room temperature and then placed in a refrigerator. The crystals were filtered off and washed with enough ethanol to cover the crystal cake. The final weight of dried crystals was 35.7 grams (65.7% yield). Their melting point was 133.0°–134.4° C.

UTILITY

Cholesterol depressants

The compounds of the present invention are useful for reducing the level of cholesterol in the blood of warm-blooded animals. They may be employed directly in suitable dosage, or as the active ingredient in the feed composition, or with suitable nontoxic carriers. Good results are obtained with dosages of from 15 to 600 milligrams of active compound per kilogram of body weight of the recipient to provide a total intake of up to 3000 mg./kg. per 24 hours.

The following Table I tabulates the percent reduction of cholesterol in the blood of rodents affected by the use of compounds of this invention. The compound was added to commercial rodent chow at a level of 0.125% by weight, and the mice were allowed to feed ad libitum for two weeks. At the end of this period, serum cholesterol determinations were performed on all the mice.

TABLE I

Percent cholesterol reduction

| Compound: | Percent reduction |
|---|---|
| Example 1 | |
| 2,2-bis-(3,5-di-t-butyl - 4 - hydroxyphenylmercapto)-propane | 59 |
| Example 2 | |
| 2,2-bis-(3,5-di-t-butyl - 4 - hydroxyphenylmercapto)-butane | 42 |
| Example 3 | |
| 2,2-bis-(3-t-butyl - 5 - methyl - 4 - hydroxphenylmercapto)-propane | 25 |
| Example 4 | |
| 2,2-bis(3-isopropyl-5-t-butyl - 4 - hydroxyphenylmercapto)-propane | 22 |
| Example 5 | |
| 1,1-bis-(3,5-di-t-butyl - 4 - hydroxyphenylmercapto)-ethane | 19 |
| Example 6 | |
| 2,2-bis-(3,5-di-t-butyl - 4 - hydroxyphenylmercapto)-pentane | 12 |

The percent reductions in cholesterol content set forth in the foregoing Table I were calculated from statistically significant data. The procedure employed for all compounds tested may be best described by its application to one of the above-listed compounds, namely 2,2-bis-(3,5-di-t-butyl-4-hydroxyphenylmercapto)-propane (Example 1). The general procedure was as follows:

Separate portions of balanced rodent mash were mixed together with each test compound to prepare a series of separate compositions each containing 0.125 percent by weight of one test compound. Separate groups of male mice of the same origin and past history were fed for two weeks on separate diets consisting of one of the above-described compositions. Based on observations of average consumption of the composition and the concentration of the test compound, each mouse received an estimated oral dosage of about 250 milligrams of test compound per kilogram of animal body weight per day. A separate group of similar male mice was fed for two weeks on a diet consisting of an identical rodent mash which contained no test compound to serve as a check. At the end of the two-week period, the mice in each group were anesthetized with ether and exsanguinated.

Serum cholesterol levels were determined for each mouse by taking a 0.05 milliliter aliquot of serum from each mouse and adding to the aliquot 3 milliliters of a 0.08 percent solution of ferric chloride in pure acetic acid. The serum was mixed with the ferric chloride-acetic acid solution and the mixture was allowed to stand for 10 to 15 minutes to flocculate protein. The protein was precipitated by centrifugation and the clear supernatant fluid was transferred to a stoppered test tube. Two milliliters of sulfuric acid was added to the supernatant and mixed well. The tubes were then left to stand exposed to air for 20 to 30 minutes. Serum cholesterol was determined by measuring the percent transmission at a wave length of 560 millimicrons in a spectrophotometer and comparing the percent transmission to that observed with solutions containing known amounts of cholesterol.

The average serum cholesterol level in milligrams of cholesterol per 100 milliliters of serum was calculated for each test group and for the check group. The percentage reduction in serum cholesterol level was calculated by dividing the difference between the cholesterol levels in the test group and the check group by the cholesterol level in the check group and multiplying the quotient by 100.

When the foregoing procedure was applied to 2,2-bis-(3,5 - di - t - butyl - 4 - hydroxyphenylmercapto) - propane, the following data were obtained:

Cholesterol level in milligrams per 100 milliliters

| | |
|---|---|
| Check group | 123 |
| Test group | 42.7 |
| Difference between cholesterol levels | 80 |
| Percent reduction of cholesterol | 65 |

No symptoms of toxicity attributable to the test compound were observed in the mice during the test period.

In order to determine effect of dosage, the foregoing general procedure was carried out employing a series of separate compositions containing 2,2 - bis - (3,5 - di - t - butyl - 4 - hydroxyphenylmercapto) - propane in amounts of 0.125, 0.06, 0.04 and 0.02 percent by weight. Serum cholesterol concentrations were determined for the test groups and for control mice, and the percent reduction of serum cholesterol was calculated as described above. The results obtained with each percentage level of test compound are set out below in Table II.

TABLE II

| Dosage level of test compound as percent by weight of diet | Percent reduction of serum cholesterol |
|---|---|
| 0.125 | 59 |
| 0.06 | 38 |
| 0.04 | 41 |
| 0.02 | 25 |

No sympotoms of toxicity were noted during the test period at any dosage level.

I claim:

1. A compound having the general formula:

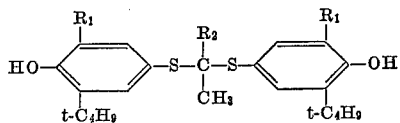

where $R_1$ is an alkyl radical containing 1 to 4 carbon atoms and $R_2$ is a radical selected from the class consisting of hydrogen and an alkyl radical containing 1 to 3 carbon atoms, provided that when $R_1$ is methyl, $R_2$ is also methyl.

2. A compound having the general formula:

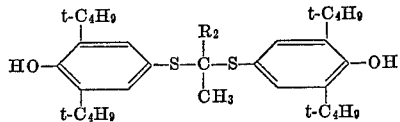

where $R_1$ is a radical selected from the class consisting of hydrogen and an alkyl radical containing 1 to 3 carbon atoms.

3. A compound having the general formula:

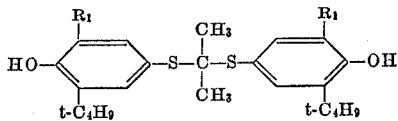

where $R_1$ is an alkyl radical containing 1 to 4 carbon atoms.

4. 2,2 - bis - (3,5 - di - t - butyl - 4 - hydroxyphenylmercapto)-propane.

5. 2,2 - bis - (3,5 - di - t - butyl - 4 - hydroxyphenylmercapto)-butane.

6. 2,2 - bis - (3 - t - butyl - 5 - methyl - 4 - hydroxyphenylmercapto)-propane.

7. 2,2-bis - (3 - isopropyl - 5 - t - butyl - 4 - hydroxyphenylmercatpo)-propane.

8. 2,2 - bis - 3,5 - di - t - butyl - 4 - hydroxyphenylmercapto)-pentane.

9. 1,1 - bis - (3,5 - di - t - butyl - 4 - hydroxyphenylmercapto)-ethane.

References Cited

UNITED STATES PATENTS 3,489,804    1/1970    O'Shea _____ 260—609

CHARLES B. PARKER, Primary Examiner

D. R. PHILLIPS, Assistant Examiner

U.S. Cl. X.R.

424—337

PO-1050
(5/69)

UNITED STATES PATENT OFFICE
CERTIFICATE OF CORRECTION

Patent No. 3,576,883     Dated April 27, 1971

Inventor(s) Martin B. Neuworth

It is certified that error appears in the above-identified patent and that said Letters Patent are hereby corrected as shown below:

Column 1, lines 14-18, the left-hand formula should appear as follows:

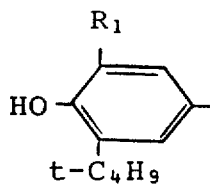

Column 2, lines 4-8 (formula (2), that portion of the formula reading

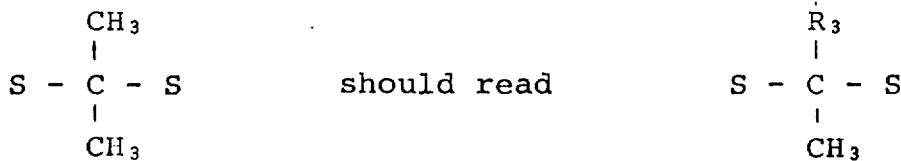

Column 7, lines 31-35 (Claim 2), that portion of the formula reading

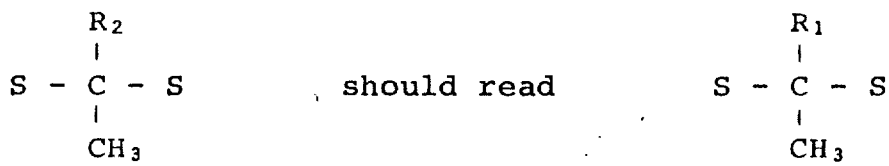

Signed and sealed this 24th day of August 1971.

(SEAL)
Attest:

EDWARD M. FLETCHER, JR.      WILLIAM E. SCHUYLER, JR.
Attesting Officer               Commissioner of Patents